(12) United States Patent
Fulton (10) Patent No.: US 11,289,126 B2
(45) Date of Patent: Mar. 29, 2022

(54) APPARATUS AND METHOD FOR EFFICIENT COLLABORATION AND CHANGE MANAGEMENT OF A NON-LINEAR EDITING PROCESS

(71) Applicant: Curtis Fulton, Vashon, WA (US)

(72) Inventor: Curtis Fulton, Vashon, WA (US)

( * ) Notice: Subject to any disclaimer, the term of this patent is extended or adjusted under 35 U.S.C. 154(b) by 0 days.

(21) Appl. No.: 17/477,204

(22) Filed: Sep. 16, 2021

(65) Prior Publication Data

US 2022/0005507 A1 Jan. 6, 2022

(51) Int. Cl.
*G11B 27/031* (2006.01)
*G06F 40/166* (2020.01)
*G06F 40/197* (2020.01)

(52) U.S. Cl.
CPC .......... *G11B 27/031* (2013.01); *G06F 40/166* (2020.01); *G06F 40/197* (2020.01)

(58) Field of Classification Search
CPC .................................................... G06F 40/166
See application file for complete search history.

(56) References Cited

U.S. PATENT DOCUMENTS

| | | | |
|---|---|---|---|
| 2010/0250497 A1* | 9/2010 | Redlich et al. | G06F 17/30 |
| 2014/0172787 A1* | 6/2014 | Greenberg et al. | G06F 17/30327 |
| 2014/0331062 A1* | 11/2014 | Tewari et al. | G06F 21/60 |

* cited by examiner

*Primary Examiner* — James J Debrow (57) ABSTRACT

A method of managing change to a non-linear editing process is described. The method accesses a stored reference edit decision list; generates a binary search tree using the reference edit decision list; flattens the binary search tree to generate a linked list that contains linked list data; and generates text-based reference linked list data from the linked list data.

20 Claims, 4 Drawing Sheets

APPARATUS AND METHOD FOR EFFICIENT COLLABORATION AND CHANGE MANAGEMENT OF A NON-LINEAR EDITING PROCESS

BACKGROUND OF THE INVENTION

In the arts of preparing content, and in particular editing a stream of media content during preparation for distribution to content consumers, content editors may use a non-linear editor (NLE) to make cut decisions on an audio and video content timeline. A non-linear editor is specialized software executed on a computing system (computer) that allows generation of the content timeline using a pointer-based system that identifies the memory storage location of previously generated and stored digitized video and audio content.

During production, the video content is filmed and the audio content is recorded. Typically, multiple scenes are acquired, digitized and stored using one or more cameras and microphones. The content that has been acquired, digitized and stored for a particular scene are referred to herein as content clips (video clip or audio clip). The content clips are stored in a memory at a known location. Often, the location in memory is identified by a file name that has been specified for each of the stored content clips. Additionally, each digitized sample of the stored content clips are identified by a time code (interchangeably referred to herein as a time stamp) or suitable identifier that identifies the content clip location within a scene.

During the post production process, using the non-linear editor, selected portions of the content clips are sequentially arranged to generate the media content. In practice, the non-linear editor is configured to generate an edit decision list (EDL). The edit decision list defines the content timeline of the media content, from the start of the media content to the end of the media content.

During the editing process, the content editor (the person operating the non-linear editor computer/program) will identify a particular content clip of interest, such as a scene or part of the scene, that will be used to generate a portion of the media content. The content editor will also identify a location along the content timeline where the content clip will be presented in the stream of the finalized media content event.

With a non-linear editor, the content editor specifies the memory location of the stored digitized content clip to the non-linear editor and specifies the point where the content clip is to go in the content timeline. For example, the content editor may specify the file name given to the content clip and a time code of the first frame of that content clip. The non-linear editor software then adds the file name and time code of the content clip into the edit decision list at the specified point in the content timeline. The content editor's specification may also include a duration of the content clip.

Once the edit decision list has been completed for the entire content timeline, the media content event can be generated. The first entry in the edit decision list identifies the beginning of the media content. Based on the specified file name and time code, the first content clip is retrieved by the non-linear editor and is stored as the first part of the media content event. The next entry identifies the second content clip, which is then retrieved and stored into the media content as the second part of the media content event. The process of retrieving and storing the sequence of content clips continues until the end of the content timeline. Once the last content clip has been retrieved and stored into the media content event, generation of the media content event has been completed.

The completed media content event is stored as media content stream. The media content stream typically comprises a synchronized stream of video content, audio content, and other information of interest such as closed stream captioning information and/or information describing attributes pertaining to the media content. The video portion of the media content, when decoded and presented on a display, presents a series of sequentially presented still images which are each presented for some predefined duration. By presenting each image for a short duration, the sequentially presentation of the series of images results in the perception by a viewer of a motion picture (interchangeably referred to herein as a video). The corresponding audio portion of the media content is presented in synchronism with presentation of the video such that the user hears sounds, such as actor dialogue and/or music, while they are viewing the video portion of the media content.

An advantage of using a non-linear editor during post production is that during editing, any of the content clips can be easily deleted, content clips can be moved to another location in the content timeline, and/or other content clips can be added into the content timeline by the editor operating the non-linear editor program. Such changes are made on a real time basis by revising the edit decision list.

If multiple parties (editors) are concurrently working on a shared edit decision list, collaboration among the editors can be achieved via a lock workflow process. In the lock workflow process, the edit decision list is locked for editing by a designated single editor who is allowed to change the edit decision list. Other editors are prevented from modifying the edit decision list. Once the edit decision list has been unlocked, the rest of the collaboration team of editors can merge their changes into the unlocked edit decision list.

The lock workflow process has several problems. For example, locking the edit decision list is arbitrary. If the edit decision list has been locked by the designated editor, who may be unreachable at sometimes, an artificial workflow impediment is created because the other editors cannot access the locked edit decision list. Locked edit decision lists create a workflow bottleneck because the various editors must take turns modifying the edit decision list. That is, the various editors cannot blend their edit decision list changes until the locked edit decision list is unlocked.

The non-linear workflow process still has several problems. For example, during a bare workflow process, if two or more editors are working on the same portion of the edit decision list, their changes may collide with each other. For example, a first edit change may be made to a particular portion of the edit decision list. Then, a later edit change may be made to the same part of the edit decision list (by simply over writing the first edit change). Accordingly, previous edit changes may be lost.

Accordingly, there is a need in the arts to provide an improved apparatus and method to enable concurrent non-linear editing of content by a plurality of content editors.

SUMMARY

A method of managing change to a non-linear editing process is described. The method accesses a stored reference edit decision list; generates a binary search tree using the reference edit decision list; flattens the binary search tree to generate a linked list that contains linked list data; and generates text-based reference linked list data from the linked list data.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
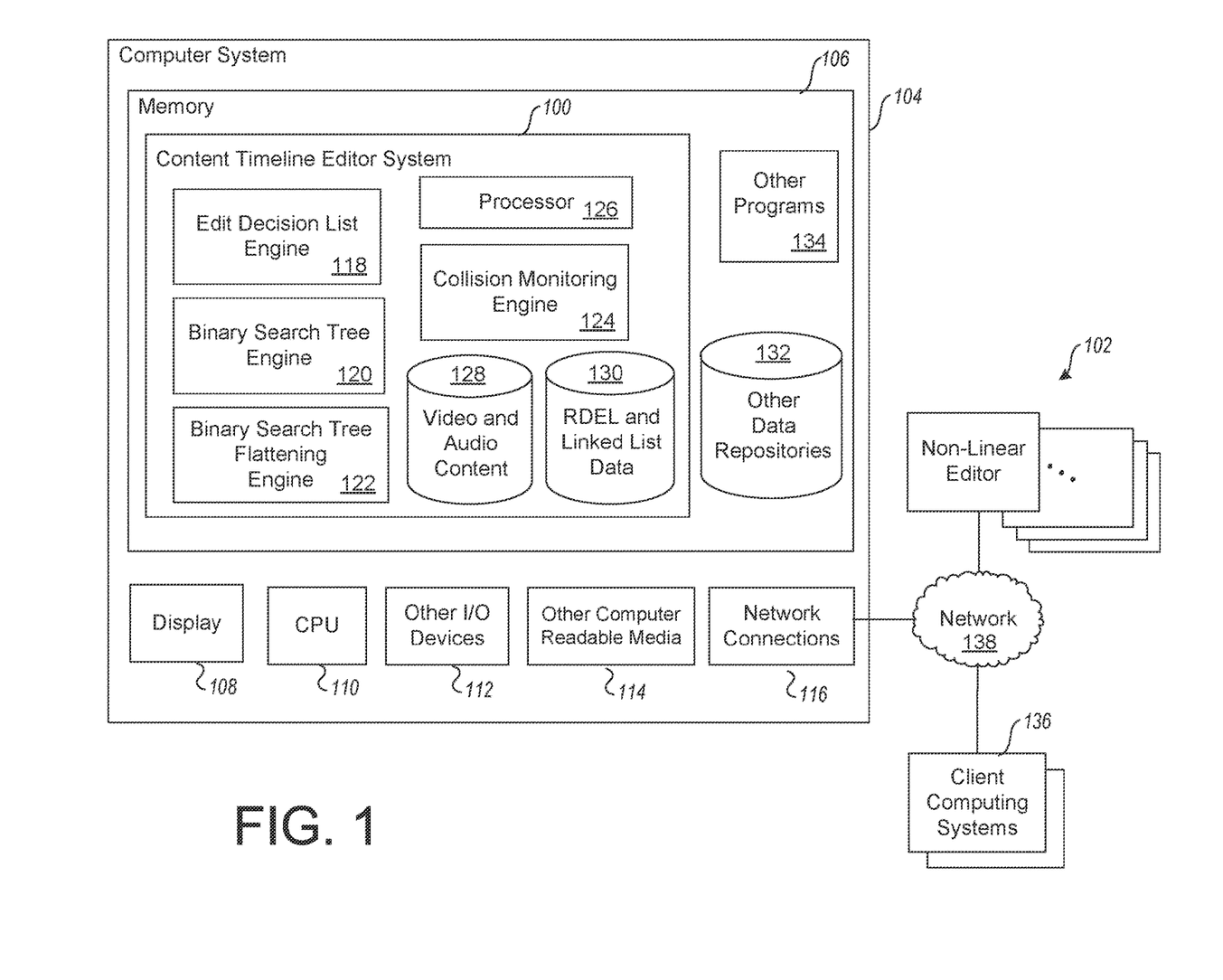
FIG. 1 is a block diagram of an embodiment of an example content timeline editor system.

FIG. 1 is a block diagram of an embodiment of an example content timeline editor system 100. The content timeline editor system 100 is a component of, or works cooperatively with, one or more non-linear editors 102. In an example embodiment, the content timeline editor system 100 maintains a reference edit decision list (RDEL) that is accessible in real time to a plurality of editors using their respective non-linear editor 102. One skilled in the art appreciates that the non-linear editor is software executing on a computer 102. Accordingly, the terms non-linear editor 102 and computer 102 may be interchangeably used within the context of this disclosure.

In the various embodiments, each content editor is able to access the reference edit decision list to ascertain the current state of the post production editing process. For example, the content editor may retrieve and save the most current reference edit decision list onto the memory of their computer 102 or to a memory medium (memory) that is communicatively coupled to their computer 102. Each content editor may, depending upon their current task and objectives, make changes to the local edit decision list stored on their computer 102. When the content editor is satisfied with their current work, the content editor may then send the revised edit decision list information with their changes that they have made to the locally stored edit decision list from their computer 102 to the content timeline editor system 100. The new edit decision list information may be communicated as an updated edit decision list. Alternatively, or additionally, the portion of the local updated edit decision list that the editor was working on may be communicated to the content timeline editor system 100. In other embodiments, changes to the local edit decision list may be communicated from the non-linear editor 102 to the content timeline editor system 100 in different manners and in different formats.

Alternatively, or additionally, a non-linear editor 102 that has been provisioned with the content timeline editor system 100 can generate an updated binary search tree, described in greater detail herein, based on the updated edit decision list. Then, the non-linear editor 102 can generate additionally or alternatively generate an updated linked list with updated linked list data. The non-linear editor 102 can additionally or alternatively then generate text-based updated reference linked list data that is communicated to the managing content timeline editor system 100 as an update.

Once the updated edit decision list information is received at the content timeline editor system 100, the most current reference edit decision list is optionally accessed for updating with the newly received updated edit decision list information. The updated reference edit decision list is then optionally re-stored by the content timeline editor system 100.

In some embodiments, supplemental information is stored in the reference edit decision list and/or may be associated with the reference edit decision list. For example, the date and time that the most current reference edit decision list was generated may be included in the supplemental information. As another non-limiting example of supplemental information, the name of the content editor and/or the content timeline of their changes may be stored so that other content editors may learn who made what changes, and what portion of the edit decision list was changed by the identified content editor. Any suitable information of interest may be stored as supplemental information.

During the update process, the content timeline editor system 100 checks for data collisions. A data collision occurs when two different content editors, using their own non-linear editor 102, make changes to the same portion of the edit decision list. As another example, collisions may happen when a content editor submits a change, but the content editor was working from an old out-of-date version of the edit decision list. If their changes were made inside the timecode range that the most recent changes were made, a collision has occurred.

Further, the location of a collision within the edit decision list can be identified very precisely. The nodes of each binary search tree are associated with a particular time in the content time line of the edit decision list. In response to identifying the collision, embodiments of the content timeline editor system 100 generate a collision report that indicates the detection of the collision, wherein the collision report indicates a precise time of the collision in the time line, and optionally provide the colliding data to the content editor Content editors can address collisions by choosing to override with their changes, keep the most recent change, or rollback to the previous change. This workflow allows any number of content editors using a content timeline editor system 100 embodiment to edit the same content timeline without locking the content timeline. That is, content timelines can be branched, modified and merged by a plurality of content editors who are concurrently editing the edit decision list using the content timeline editor system 100. The entire history of the content timeline may be stored so any content editor can go back to a historical version of the content timeline. The conflict between the updated edit decision list information must be resolved before a valid current reference edit decision list can be generated. In some situations, the editors submitting the changes are notified of the collision. Alternatively, or additionally, a chief editor in charge of the post production process may be notified of the collision. Once the collision has been resolved by the various content editors, a new reference edit decision list can be generated by the content timeline editor system 100.

One skilled in the art appreciates that the task of managing a content timeline defined by an edit decision list is exceedingly complex and difficult. In particular, the digital data sampling rates for video data and audio data are very high. For example, the forty eight kilo hertz (48 k Hz). Accordingly, there is an incredibly large amount of video and audio data that must be tracked with a high degree of precision using a sample-level precision edit decision list which makes the task complex and difficult for the content editors. Even one second of a media content event may have hundreds of thousands of pieces of data.

Embodiments of the content timeline editor system 100 manage the process of tracking the video and audio data identified in the reference edit decision list with the requisite degree of precision using a novel approach of representing time line information within the reference edit decision list. The novel approach is to represent information of an edit decision list using a binary search tree. The binary search tree is advantageous because redundant data is consolidated into a single address, which can be represented as a node in the binary search tree. The binary search tree information is flattened into a linked list. Once the binary search tree (with the edit decision list information) is flattened into the linked list, the linked list data is stored by the content timeline editor system 100 using a text-based source code management (SCM) system. That is, the edit decision list is converted into the text-based linked list data. While SCM systems are traditionally used to manage computer program source code, in the context of this disclosure, the SCM system used by the content timeline editor system 100 is used to store the linked list data corresponding to the latest edit decision list versions. Any SCM system now known or later developed is intended to be within the scope of this disclosure and to be protected by the accompanying claims.

Embodiments of the content timeline editor system 100 can quickly compare the text-based linked list data of the reference edit decision list with the text-based linked list data of the received updated edit decision list information. Based on the comparison of the text-based reference linked list data and the text-based updated linked list data, potential collisions can be readily identified. That is, a collision can be identified when one of the filled nodes of the text-based reference linked list data corresponds to a filled noted of the text-based update linked list data.

Further, the location of the collision within the edit decision list can be identified very precisely. Here, if the updated linked list data indicates that the editorial change to the edit decision list is made at a null location in the binary search tree of the linked list data, then the content timeline editor system 100 determines that there will not be a data collision when the current reference edit decision list is updated using the updated edit decision list information. Alternatively, if the comparison between the text-based reference linked list data and the text-based updated linked list data indicates that one of more of the nodes of the binary search tree is already occupied with data that would otherwise be changed in a new updated edit decision list, then the content timeline editor system 100 precisely determines the location of the potential data collision.

Here, one skilled in the art, after reading and contemplating the disclosure of this specification, will realize that the process of comparing the text-based reference linked list data with the text-based updated linked list data is computationally more efficient than comparing a reference edit decision list with an updated edit decision list (or even the updated edit decision list information).

Furthermore, the SCM system enables call back of previous versions or merge collisions. The SCM system process can also be reversed to generate an edit decision list that can be fed back into the non-linear editor 102.

The disclosed content timeline editor system 100 will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various content timeline editor systems 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Communicatively coupled" means connected electronically to other devices, whether directly or indirectly through intervening components, in a manner that facilitates electronic communication of information and/or data between devices.

Returning to FIG. 1, computer system 104 comprises a computer memory ("memory" or memory medium) 106, an optional display 108, one or more Central Processing Units ("CPU") 110, optional Input/Output devices 112 (e.g., keyboard, mouse, CRT or LCD display, etc.), other computer-readable media 114, and one or more network connections 116. The edit decision list engine 118, the binary search tree engine 120, the tree flattening engine 122, the collision monitoring engine 124, the processor 126, the video and audio content data 128, and the reference edit decision list (REDL) and linked list data 130 are shown residing in memory 102. In other embodiments, some portion of the contents and/or some of (or all of) the components of the interactive video introduction system 100 may be stored on and/or transmitted over the other local and/or remote computer-readable media. In some embodiments, the edit decision list engine 118, the binary search tree engine 120, the tree flattening engine 122, and/or the collision monitoring engine 124 may be integrated with each other and/or with other logic.

Note that one or more general purpose virtual or physical computing systems suitably instructed or a special purpose computing system 104 may be used to implement a content timeline editor system 100. Further, the content timeline editor system 100 may be implemented in software, hardware, firmware, or in some combination to achieve the capabilities described herein. Note that one or more general purpose or special purpose computing systems/devices communicatively coupled together may be used to implement the described techniques. However, just because it is possible to implement the content timeline editor system 100 on a general purpose computing system does not mean that the techniques themselves or the operations required to implement the techniques are conventional or well known.

The content timeline editor system 100 may comprise one or more communicatively coupled server and/or client computing systems, and/or may span distributed locations. In addition, each block shown may represent one or more such blocks as appropriate to a specific embodiment and/or may be combined with other blocks. Moreover, the various blocks of the content timeline editor system 100 may physically reside on one or more machines, which use standard (e.g., TCP/IP) or proprietary interprocess communication mechanisms to communicate with each other.

The video and audio content clips are stored in the REDL and linked list data 130 portion of memory 106. The location of each content clip is known and is preferably identified by a unique identifying name. The content clips may be optionally associated with other supplemental information, such as, but not limited to, an identifier of the camera or microphone. Data within the content clips are further identified by a time code or the like. The REDL and linked list data 130 stores the generated current reference edit decision list, optionally previously generated reference edit decision lists, and the associated linked list data. In some embodiments, the reference edit decision lists and/or linked list data may be stored locally in the memory 106. Alternatively, or additionally, the information may be stored in other data repositories 132 that may be local and/or that may be remote from the computer system 104.

The components of the content timeline editor system 100 preferably execute on one or more CPUs 110 executing the processor 126 to manage the generation and use of the edit decision lists, as described herein. Other code or programs 134 and potentially other data repositories, such as data repository 132, also reside in the memory 106, and preferably execute on one or more CPUs 110. Of note, one or more of the components in FIG. 1 may not be present in any specific implementation. For example, some embodiments embedded in other software may not provide means for user input or display.

In an example embodiment, components/modules of the content timeline editor system 100 are implemented using standard programming techniques. For example, the content timeline editor system 100 may be implemented as a "native" executable running on the CPU 110, along with one or more static or dynamic libraries. In other embodiments, the interactive video introduction system 100 may be implemented as instructions processed by a virtual machine. In general, a range of programming languages known in the art may be employed for implementing such example embodiments of the interactive video introduction system 100, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments of the content timeline editor system 100 described herein may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

Also, the example content timeline editor system 100 may be implemented in a distributed environment comprising multiple, even heterogeneous, computer systems and networks. Different configurations and locations of programs and data are contemplated for use with techniques of described herein. In addition, the interactive video introduction system 100 may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an interactive video introduction system 100.

Furthermore, in some embodiments, some or all of the components of the content timeline editor system 100 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like that are communicatively coupled and/or controllably coupled with each other. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Accordingly, embodiments of the interactive video introduction system 100 may be practiced with other computer system configurations.

In practice, the content editor who is operating the computer system 104, executing the edit decision list engine 118, may operate the content timeline editor system 100 to retrieve and then present on the display 108 a portion of, or all of, the media content in accordance with the current reference edit decision list, earlier generated reference edit decision lists, and/or updated edit decision list information provided by a remotely located non-linear editor 102. After review of edits to the reference edit decision list provided by one or more of the non-linear editors 102, the content editor may conclude that the proposed new edits are satisfactory. Assuming any identified collisions have been resolved, the content editor may operate the computer 104 to generate a new reference edit decision list which is then stored into the REDL and linked list data 130 or into another suitable memory medium. The content editor may control operation of the computer 104 using the various input/output (I/O) devices 112.

The content timeline editor system 100, the non-linear editors 102, and other client computing systems 136 are communicatively coupled together via a communication network 138. The communication network 138 is illustrated as a generic communication system. In one embodiment, the communication network 138 comprises the Internet. Accordingly, the computer 104, the non-linear editors 102, and/or client computing systems 136 have a suitable modem or Internet connection device, generically represented as the network connections 116. Alternatively, the communication network 138 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the content timeline editor system 100 may be implemented on other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the content timeline editor system 100 may be employed on combination systems having a plurality of segments which employ different formats for each segment employing different technologies on each segment.

Figure 2:
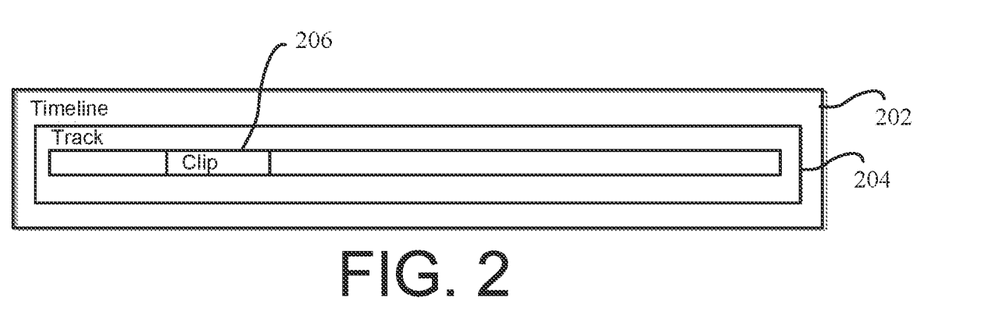
FIG. 2 conceptually illustrates an example content timeline.

The content timeline editor system 100 divides a working edit decision list into the following parts: a sample, an event, and a sample stream. FIG. 2 conceptually illustrates an example edit decision list 202 (interchangeably referred to herein as a time line). The timeline 202 includes at least one track 204. For example, track 204 may be a video track. Typically, the timeline 202 comprises a plurality of tracks 204, such as video and audio tracks. Within a track are a plurality of clips 206. Each clip 206 contains content information over a time span in the timeline 202. Clips 206 may be video clips or audio clips. One skilled in the art appreciates that the completed media content event comprises a continuous sequence of time ordered video clips and audio clips that presents a thematic story line.

Figure 3:
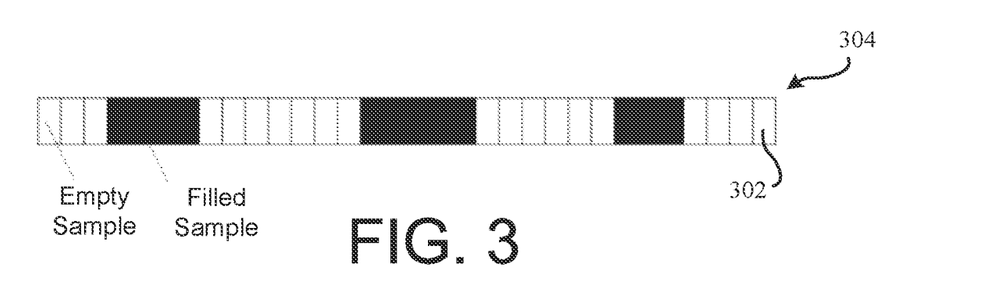
FIG. 3 conceptually illustrates an example plurality of samples of a sample stream.

FIG. 3 conceptually illustrates a plurality of samples 302 in an example sample stream 304. Some samples 302 are empty. Other samples 302 are filled with edit decision list information (pointer information that identifies a selected event that is a portion of stored content, such as portions of video clips and/or audio clips) for a single track.

A sample 202 spans a discrete moment in time for a defined period of time (duration). Each sample is associated with the discrete time in the content timeline 202 (FIG. 2). The data of the reference edit decision list (and any other edit decision list) are also associated with a time in the content time line. When data in the reference edit decision list corresponds to a time of a sample, the pointer information from the edit decision list is copied into that sample. It is the smallest unit in the content timeline 202.

Each sample 302 points to a single event that is associated with that sample. An event is an immutable set of attributes. A sample stream 304 is a sequence of samples, ordered chronologically editorial content timeline assets are broken down into unique events. The event duration is expressed by a sequence of a plurality of samples 302 (each associated with same content clip), which are inserted into a sample stream 304. If a content timeline 202 has multiple tracks, a distinct sample stream 304 is created for each track.

The content timeline editor system 100 divides the entire content timeline 202 into the smallest unit of time (duration), referred herein as the sample 302. Edit decision list changes, collisions, branches and merges all operate on the sample level. However, sample-level precision is not trivial. The internal time base (or sample rate) for modern non-linear editor projects is often 48 kilohertz (48,000 samples a second) or higher.

Simply filling a sample stream 304 with 48,000 samples 302 per second is impracticable. To solve this problem, the data stored in a sample is a pointer or the like, interchangeably referred to herein as pointer information, that indicates location of the stored video data or audio data in memory. The stored pointer also includes an associated time code. For example, the video data for each video frame in a video clip will have an associated time code, typically corresponding to a time that the frame was acquired by a camera or other image capture device. In some embodiments, the video or audio clip memory location may be identifiable by a file name that has been specified by the content editor. The non-linear editor 102 is the device that stores the pointer information or data into a particular sample based on a specification provided by the content editor.

Figure 4:
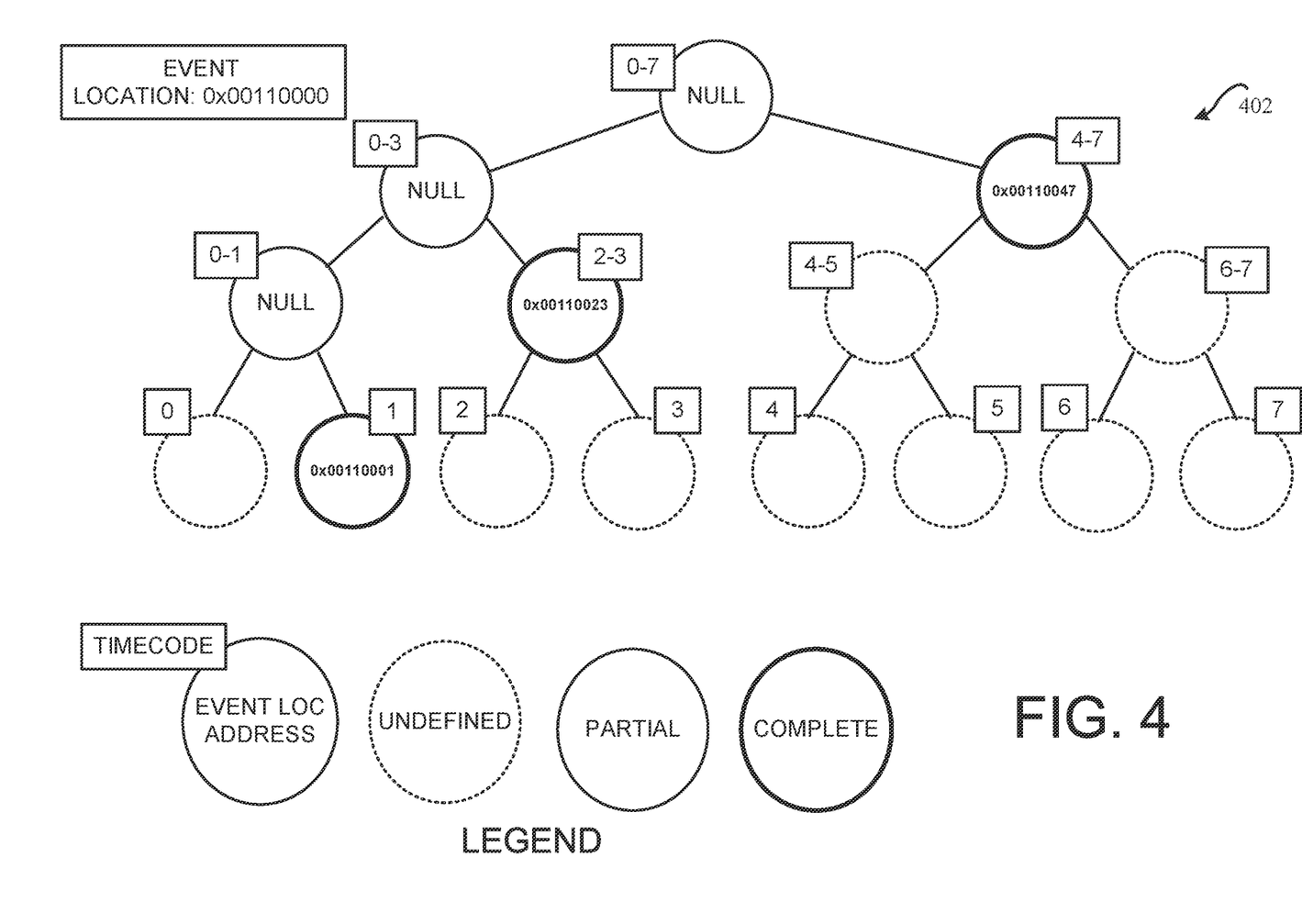
FIG. 4 conceptually illustrates an example search binary tree.

FIG. 4 conceptually illustrates an example binary search tree. The content timeline editor system 100, executing the binary search tree engine 120, processes the current reference edit decision list into a binary search tree 402 to mark relatively large sections of the sample stream 302 (sequence of samples) as part of an event.

Each sample corresponds to a lowest node in the binary search tree 202. A node is empty (null) if no content data (video and/or audio data) has been specified for that place in the content timeline. If content data has been specified by a content editor using their non-linear editor 102, then data is complete for that node. Higher nodes in the binary search tree will be complete if the span of time associated with that node has content data. In the simplified conceptual example illustrated in FIG. 4, the nodes 1, 2-3, and 4-7 are all complete. That is, for the periods of time in the content timeline associated with the nodes 1, 2-3, and 4-7, the content editor has specified the content clips, or portions thereof, that are to be used in the media content stream. Other portions of the content time line, in accordance with the reference edit decision list, do not have specified content.

Figure 5:
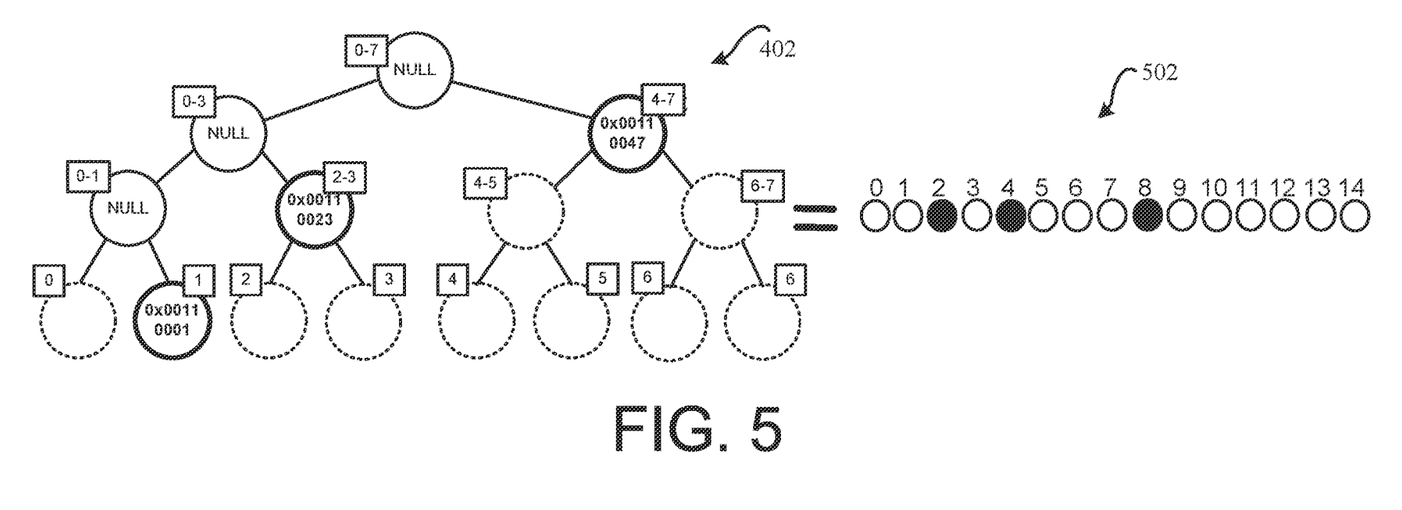
FIG. 5 conceptually illustrates an example linked list that is generated from the binary search tree.

FIG. 5 conceptually illustrates an example linked list data 502 (interchangeably referred to as an array 502) that is generated by flattening the binary search tree 402. Here, the content timeline editor system 100, executing the binary search tree flattening engine 122, flattens the binary search tree that has been generated using the reference edit decision list to generate the linked list data 502. Any suitable binary search tree flattening algorithm now known or later developed is intended to be included within the scope of this disclosure and to be protected by the accompanying claims.

Figure 6:
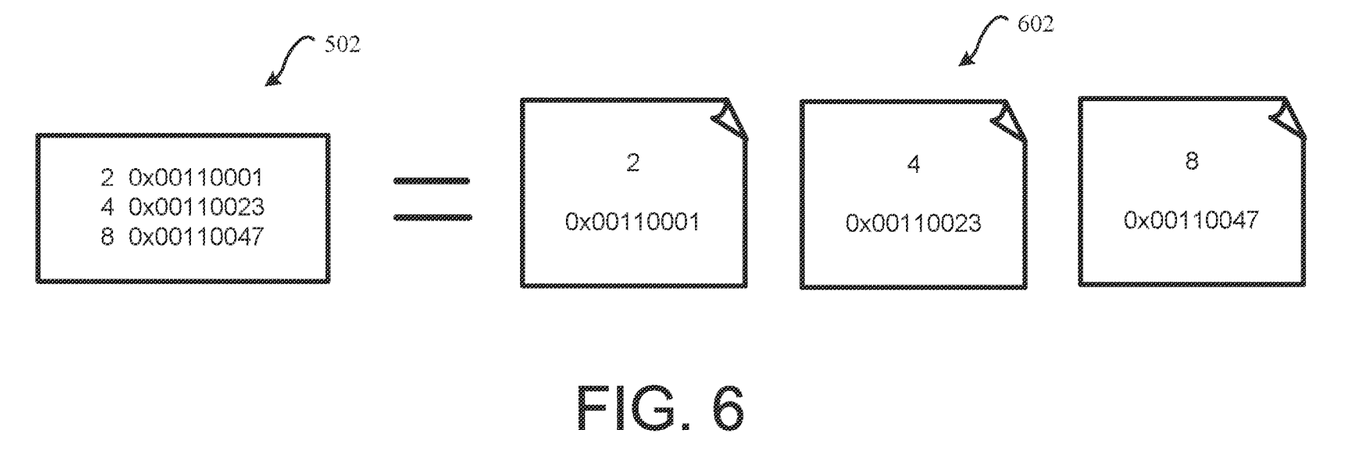
FIG. 6 conceptually illustrates an example plurality of computer files generated from linked list data.

FIG. 6 conceptually illustrates an example plurality of text-based computer files 602 (interchangeably referred to herein as text-based reference linked list data) generated from linked list data 502 by the content timeline editor system 100. The linked list data 502 is converted into a text-based list of small computer files 602 by the executing the binary search tree flattening engine 122. That is, the text-based reference linked list data 602 is generated from the linked list data 502.

Once the edit decision list 202 has been reduced into a series of small computer files 602, they can be applied to any file/text-based version control system by the content timeline editor system 100 and stored in the REDL and linked list data 130 or another suitable memory medium. These text-based files 602 may be used to quickly detect changes, versioning, branching, merging, and managing merge conflicts using embodiments of the content timeline editor system 100.

Further, the edit decision list change events are content-addressable. Accordingly, the memory address location of the individual events may be derived from the content (attributes) of the text-based files 602. If an attribute changes, the address changes, essentially making a new event, the change to the corresponding file 602 can be detected. In this way, edit decision list change events are immutable.

Embodiments of the content timeline editor system 100 provide several unexpected advantages to the process of conventional editing of an edit decision list. Embodiments support simultaneous edit decision list edits. Here, an unlimited number of content editors can make concurrent changes to the same edit decision list at the same time. Any change to the edit decision list results in a new version of the reference edit decision list maintained by the content timeline editor system 100. All historical versions of edit decision lists are saved and can be quickly accessed by any of the content editors. Embodiments of the content timeline editor system 100 support unlimited timeline branching and merging. That is, the edit decision lists can be quickly branched. Changes between branches of a binary search tree 402 can be merged. Embodiments of the content timeline editor system 100 are fast and efficient. Here, timeline versioning and branching can be quickly done with little computation. Preferably, edit decision list versions are stored as deltas, so only the changed portions of the edit decision list are stored for each version. And, the content timeline editor system 100 is application independent. That is, the content timeline information is stored in a way that permits any non-linear editor 102 to understand the reference edit decision list in entirety. Any application can read and modify the reference edit decision list independently.

It should be emphasized that the above-described embodiments of the content timeline editor system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A method of managing change to a non-linear editing process, comprising:
   accessing a stored reference edit decision list from a memory medium,
      wherein the reference edit decision list corresponds to a content timeline associated with the accessed reference edit decision list,
      wherein the content timeline is defined by a chronologically ordered sequence of a plurality of filled samples or a plurality of null samples in a sample stream,
      wherein each sample spans a discrete duration and is associated with a discrete time in the content timeline,
      wherein a null sample of the plurality of null samples is empty, and
      wherein a filled sample of the plurality of filled samples stores pointer data that identifies a location of an event in the memory medium;
   generating a binary search tree using the reference edit decision list,
      wherein a null node of the binary search tree corresponds to one of the plurality of null samples, and
      wherein a filled node of the binary search tree corresponds to one of the plurality of filled samples;
   flattening the binary search tree to generate a linked list that contains linked list data; and
   generating text-based reference linked list data from the linked list data.

2. The method of claim 1, wherein a predefined plurality of sequential samples define an event duration for the event.

3. The method of claim 1, further comprising:
   storing the text-based reference linked list data in the memory medium.

4. The method of claim 3, further comprising:
   receiving text-based updated linked list data from a remotely located non-linear editor;

comparing the text-based reference linked list data with the text-based updated linked list data;

identifying a collision when one of the filled nodes of the text-based updated linked list data corresponds to a filled node of the text-based reference linked list data; and determining that no collision has occurred when all filled nodes of the text-based updated linked list data correspond to the null nodes of the text-based reference linked list data.

5. The method of claim 4, wherein in response to identifying the collision, the method further comprising:

generating a collision report that indicates the detection of the collision, wherein the collision report indicates a precise time of the collision in the time line.

6. The method of claim 4, further comprising:

storing the text-based updated linked list data in the memory medium with associated supplemental information that identifies an attribute of the updated linked list data.

7. The method of claim 6, wherein the attribute of the supplemental information identifies a time that the updated linked list data was generated at the non-linear editor.

8. The method of claim 6, wherein the attribute of the supplemental information identifies a name of the content editor who generated the updated linked list data.

9. The method of claim 6, further comprising:

generating a new reference edit decision list by combining the updated edit decision list information into the reference edit decision list in response to determining that no collision has occurred; and storing the new reference edit decision list as a current reference edit decision list.

10. The method of claim 9, further comprising:

generating a new reference binary search tree using the new reference edit decision list, wherein a null node of the new binary search tree corresponds to one of the plurality of null samples, and wherein a filled node of the new binary search tree corresponds to one of the plurality of filled samples;

flattening the new binary search tree to generate a new linked list that contains the updated linked list data and the reference edit decision list data;

generating new text-based reference linked list data from the new linked list data; and storing the new text-based reference linked list data in the memory medium.

11. The method of claim 10, further comprising:

communicating one of the new updated linked list data or the new text-based reference linked list data to the non-linear editor.

12. The method of claim 3, further comprising:

receiving updated linked list data from a remotely located non-linear editor;

generating an updated binary search tree using the received updated linked list data, wherein a null node of the updated binary search tree corresponds to one of the plurality of null samples, and wherein a filled node of the updated binary search tree corresponds to one of the plurality of filled samples;

flattening the updated binary search tree to generate an updated linked list that contains updated linked list data; and generating text-based updated linked list data from the updated linked list data.

13. The method of claim 12, further comprising:

comparing the text-based reference linked list data with the text-based updated linked list data;

identifying a collision when one of the filled nodes of the text-based updated linked list data corresponds to a filled node of the text-based reference linked list data; and determining that no collision has occurred when all filled nodes of the text-based updated linked list data corresponds to the null nodes of the text-based reference linked list data.

14. The method of claim 13, further comprising:

generating a collision report that indicates the detection of the collision, wherein the collision report indicates a precise time of the collision in the time line.

15. The method of claim 12, further comprising:

storing the text-based updated linked list data in the memory medium with associated supplemental information that identifies an attribute of the updated linked list data.

16. The method of claim 15, wherein the attribute of the supplemental information identifies a time that the updated linked list data was generated at the non-linear editor.

17. The method of claim 15, wherein the attribute of the supplemental information identifies a name of the content editor who generated the updated linked list data.

18. The method of claim 15, further comprising:

generating a new reference edit decision list by combining the updated edit decision list information into the reference edit decision list in response to determining that no collision has occurred; and storing the new reference edit decision list as a current reference edit decision list.

19. The method of claim 18, further comprising:

generating a new reference binary search tree using the new reference edit decision list, wherein a null node of the new binary search tree corresponds to one of the plurality of null samples, and wherein a filled node of the new binary search tree corresponds to one of the plurality of filled samples;

flattening the new binary search tree to generate a new linked list that contains the updated linked list data and the reference edit decision list data;

generating new text-based reference linked list data from the new linked list data; and storing the new text-based reference linked list data in the memory medium.

20. The method of claim 19, further comprising:

communicating one of the new updated linked list data or the new text-based reference linked list data to the non-linear editor.

* * * * *